May 18, 1971  W. R. HUFENDICK  3,579,315

METHOD OF PRECISION FORM MILLING

Filed May 1, 1968  2 Sheets-Sheet 1

INVENTOR.
WILLIAM ROWE HUFENDICK
BY Joseph W. Holloway
ATTORNEY

United States Patent Office 3,579,315
Patented May 18, 1971

3,579,315
METHOD OF PRECISION FORM MILLING
William Rowe Hufendick, Quincy, Ill., assignor to Gardner-Denver Company
Filed May 1, 1968, Ser. No. 725,647
Int. Cl. B24b 1/00
U.S. Cl. 51—288                                     3 Claims

ABSTRACT OF THE DISCLOSURE

Precision in form milling processes using arbor-type milling cutters is improved by providing a unitary arbor and cutter assembly which is mounted on a cutter grinding machine and rotated for individual cutter tooth forming and sharpening thereby establishing an axis and plane of rotation for each point on the cutter profile. After grinding and sharpening of the cutter teeth, the unitary arbor-cutter assembly is transferred to a milling machine and mounted in a manner duplicating the grinder mounting thereby exactly preserving the axis and plane of rotation of the cutter which was established during the grinding operation.

BACKGROUND OF THE INVENTION

In the manufacture of equipment incorporating helical screw rotors, form milling of the rotor lobe profiles has proven to be an acceptable machining method. The equipment and cutters required are relatively simple and conventional machine tools frequently are employed. In high-production form milling, arbor mounted inserted tooth type cutters are commonly used in preference to shank or integral arbor type cutters to facilitate economical replacement of cutter teeth, cutter bodies, and arbors. With inserted tooth cutters, the teeth alone are required to be made of costly cutting tool materials such as high speed steel or sintered carbides; the cutter bodies and arbors being made of ordinary low cost steel or other suitable materials. This flexibility and cost savings afforded by form milling is often accomplished, however, by sacrificing the maintenance of cutter form accuracy in the overall machining process.

The basic problem becomes one of maintaining true position of the axis and plane of rotation of the cutter when transferring the cutter from a form grinding machine to the milling machine. For example, in conventional practice, cutter bodies are made with a central bore for slidably mounting on a work arbor of the grinding machine. The work arbor itself is usually supported on headstock and tailstock centers. For ease in mounting and removing the cutter bodies from the arbor, diametral clearances between the cutter bore and the arbor diameter in accordance with accepted values for free or medium fits are necessary. Positioning of a cutter and the spacing of plural cutters on an arbor is accomplished by using cylindrical spacers or collars slidable over the arbor diameter and held in place by a locknut threadably attached to one end of the arbor. When the cutter teeth have been ground to form and sharpened, an axis of rotation has been established and each point on the cutter profile rotates in a plane perpendicular to the axis of rotation. However, in accordance with the conventional practice, the cutter bodies are removed from the grinder work arbor and are transferred to a milling machine arbor and collar assembly. In the transferral process, the established axis and plane of rotation of the cutter will be disturbed due to the loose fits necessarily provided for ease in the transferral and repositioning or spacing of the cutters and the collar segments. Restoration of the exact axis and plane of rotation to establish accurate form cutting of the workpiece becomes exceedingly time consuming, if not impossible, for even the most skilled machine operators. Tedious shimming and measuring operations are always required to reposition the cutters to turn about the same axis of rotation and to rotate in the same plane of rotation as those established during the grinding process. Normal dimensional inaccuracies in interchangeable sets of arbor collars also produce a skew condition between the first established plane of rotation and axis of rotation when the cutters are secured on the milling machine arbor. Slight errors in perpendicularity between collar bores and end faces are sometimes multiplied in changing collar sets; and, the operation of interchanging arbors and collars in the working atmosphere of most machine shops exposes the matching surfaces to contamination by minute chips and grindings further aggravating the conditions causing imprecise repositioning of the cutters.

SUMMARY OF THE INVENTION

In form or contour milling of articles, the true positions of the milling cutter axis and plane of rotation are maintained by the method and apparatus of the invention as used with conventional machines and equipment. The invention may be carried out by free fitting conventional milling cutters on a specially constructed arbor; and, positioning and spacing of the cutters are accomplished with standard arbor collars. An essential feature of the invention is that the parts of the arbor-cutter assembly are releasably locked together to prevent relative movement therebetween. One end of the unitary arbor-cutter assembly is mounted in a contour cutter grinding machine by piloting a reduced diameter portion of the arbor in a pilot bore on the grinder headstock spindle and the other end of the arbor is journaled in a plan bearing and support therefor.

In the successive grinding of each cutter tooth, an axis of rotation and a plane of rotation for each point on the contour are established and maintained by transferring the arbor-cutter assembly as a whole to the milling machine and remounting the arbor in an identical manner. Practicing the method of the invention provides for more accurate form milling and better distribution of cutting forces over the cutting edge of each tooth as well as between individual teeth. The dimensional differences between interchangeable arbor and collar assemblies are avoided by the use of the unitary arbor-cutter assembly. Further improvement in maintaining true positioning of the arbor is provided for by certain structural features of the arbor which provides for similar support means on the grinder and the milling machine rather than interchanging center-type and journal bearing-type support means.

The method and apparatus of the invention as well as the advantages and salient features will be better understood from the detailed description of the preferred embodiments.

DESCRIPTION OF THE PREFERRED EMBODIMENTS

Figure 4:
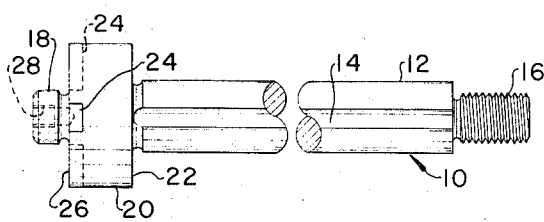
FIG. 4 illustrates details of the specially constructed arbor used in practicing the invention.

In practicing a preferred mode of the invention, a specially constructed arbor is used which is shown in FIG. 4 and generally designated by the numeral 10. The arbor 10 is characterized by a main support diameter 12 having a keyway 14 relieved along substantially its entire length, a reduced threaded portion 16 at one end, and a spindle pilot diameter 18 at the opposite end. An enlarged diameter portion 20 forms a shoulder 22 with the main cutter support diameter 12; and, portion 20 has four angularly spaced radial keyways 24 relieved in a reference surface 26. A threaded bore 28 is also provided at the spindle pilot diameter end of the arbor. The pilot diameter 18 and support diameter 12 are finish machined to be concentric and parallel within normally accepted toolroom precision tolerance limits that is, conforming to the specified dimension within tenths of thousandths of an inch (.0001–.0009 inch). Also, the surface 26 is machined to be particular or square to the diameters 12 and 18 within the same class of precision.

Figure 6:
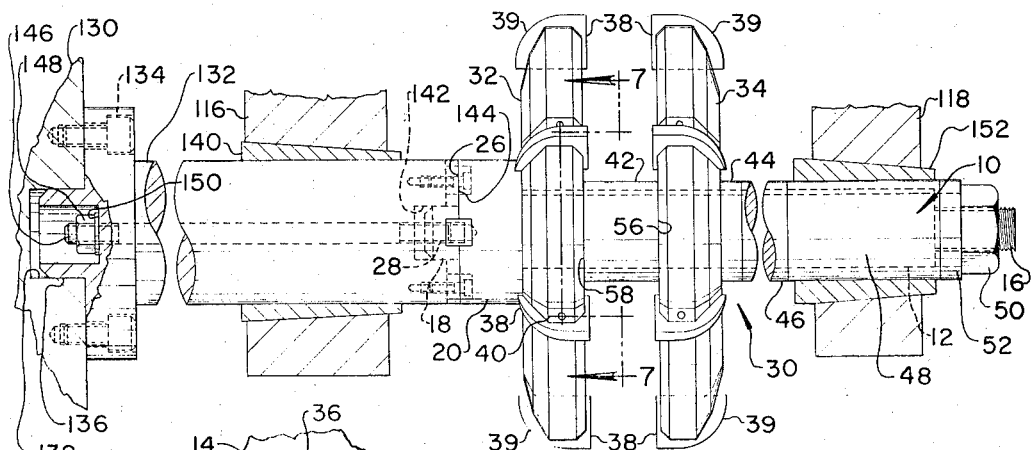
FIG. 6 is an elevation of the unitary arbor-cutter assembly illustrating further details of the mounting shown in FIG. 4.
Figure 7:
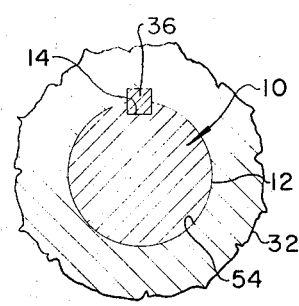
FIG. 7 is a sectional view taken along the line 7—7 of FIG. 6.

A unitary arbor-cutter assembly is designated by the numeral 30 and is best illustrated in FIG. 6. The assembly 30 includes the arbor 10 and the cutter bodies 32 and 34 which are slidably mounted over the support diameter 12 and nonrotatively secured to the arbor 10 by an elongated key 36 interfitting in the keyway 14. The cutter bodies 32 and 34 are of the inserted tooth type having a plurality of angularly spaced cutting teeth 38 removably secured in place on the cutter bodies by retainers 40. The cutter bodies are spaced by an interposed collar 42, and are further positioned on the arbor 10 by a plurality of collars 44, 46 and 48. All of the collars 42, 44, 46 and 48 are nonrotatively secured by the key 36 and the entire assembly of cutter bodies and collars is secured against axial movement on the arbor 10 by a locknut 50 threaded on the portion 16, and bearing directly on a spacer 52. As in the fabrication of the arbor 10, the collars are made with toolroom quality dimensional tolerances. However, to achieve practicality in interchanging cutter bodies 32 and 34 on the arbor 10, it is preferable that a two-inch diameter arbor, for example, have a diametral clearance with the cutter body bore of from approximately .0017 inch to .0032 inch. This would be the diametral dimensional difference, in FIG. 7, between the bore 54 of the cutter body 32 and the arbor diameter 12. Additional problems in maintaining accuracy with conventional arbor-mounted cutters have been encountered due to the typical errors in perpendicularity or squareness of the opposed end faces 56 and 58 on the spacing collar 42 relative to the axis of the bore 59. Of course, the mating end faces of all the collars inclusive of items 44, 46 and 48 must be considered because errors in squareness of all these surfaces relative to the bore axes can be cumulative to aggravate a skew condition between the cutter body bore axis and the arbor axis when an assembly 30, as shown in FIG. 6, is put together and the nut 50 tightened to draw all components into engagement.

Of particular importance is accuracy in axial spacing of the cutter bodies 32 and 34 which, as shown in FIG. 6, is provided by the collar 42. In a preferred method of machining helical screw rotors, as disclosed in U.S. Pat. 3,180,229, opposite flanks of adjacent grooves of a rotor blank are form milled concurrently. With this method it is critiaclly important that the axial spacing of the cutting edges 39 on the respective cutters 32 and 34, established during the cutter tooth grinding process, be maintained within limits which have heretofore been unattainable when practicing the prior art method of interchanging both the arbors and the spacing collars between the grinding and milling processes. Even without interchanging the collar 42, but with an interchange of only the arbors, machine operators have experienced the necessity of repeated shimming and gauging operations to restore the exact desired spacing of the cutters. However, in accordance with the present invention, these dimensional inaccuracies and clearances are of no consequence for, once the arbor-cutter assembly 30 has been put together, it remains as an assembly until it is necessary to replace worn or damaged components or it is desired to disassemble the arbor and collars for use with other sizes or types of cutters. Moreover, by keeping the arbor-cutter in its assembled condition, there is no risk of contamination of the cooperating surfaces of the cutter bodies, collars, and arbor with foreign matter such as minute metal chips and grinding dust, ever present in the work areas of toolrooms and machine shops.

In practicing the method of the instant invention, it was discovered that the conventional practice and apparatus used on grinding machine equipment was inadequate to establish the accuracy required in form milling of the type disclosed herein. Grinding machines in the prior art customarily mount work arbors on lathe centers of the type well known in the machine tool art. This type of support requires conical bores in the arbor end faces for receiving complementary conical center pieces supported by the tailstock and head stock, respectively. However, these supports are inadequate for use in milling machine practice since the bearing area provided is not sufficient for the magnitude of reactive forces exerted on the cutter in the milling process; consequently, journal bearing type support of the arbor is required in the milling machine. Heretofore, the transfer of support from the lathe centers used in the grinding machine to the journal bearing supports on the milling machine introduced a small but significant change in the position of the axis of rotation of the arbor which cannot be tolerated in form milling precision parts such as helical screw rotors. This condition is avoided with the method and apparatus of the present invention as described herein.

Figure 1:
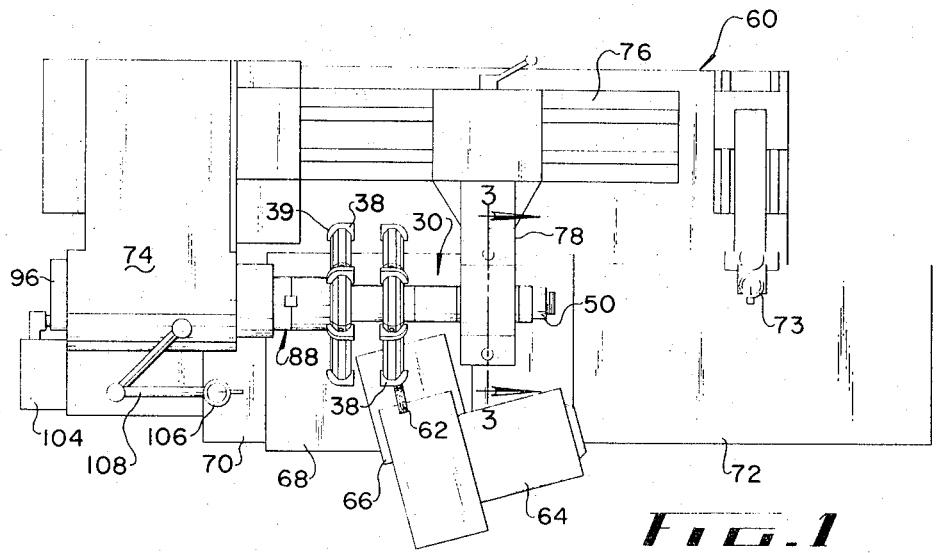
FIG. 1 is a plan view of a typical contour cutter grinding machine with the unitary arbor-cutter assembly in position for form grinding of the cutter teeth.
Figure 3:
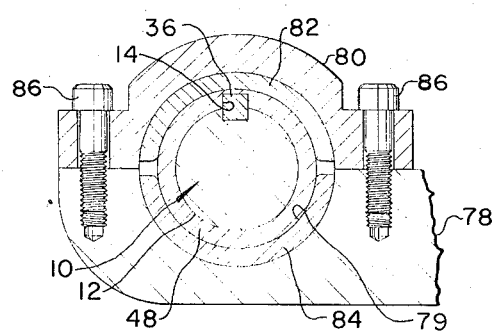
FIG. 3 is a partial section view taken along the line 3—3 of FIG. 1.

After initial assembly, the unitary arbor-cutter 30 is placed in a grinding machine as illustrated in FIG. 1 and generally designated by numeral 60. The grinding machine 60 is of the contour cutter grinding and sharpening type in which a grinding wheel 62 is driven by a motor 64 and mounted on a wheelhead unit 66. The wheelhead unit 66 is preferably controlled in a conventional manner to follow a form template (not shown) whereby the desired cutter form or contour is reproduced on the cutting edge 39 of each cutter insert tooth 38. The wheelhead unit 66 is mounted on a series of movable tables 68 and 70 supported by a base 72. A truing indicator 73 is used for periodically checking the template to grinding wheel dimensional relationship. The grinding machine further comprises a workhead body 74, tailstock support 76, and a specially contructed tailstock 78. As shown in FIGS. 1 and 3, the tailstock 78 includes a precision formed plain cylindrical split shell bearing bore 79 formed by the tailstock 78, a cap 80, and bearing inserts 82 and 84. The cap 80 is fastened to the tailstock by capscrews 86. As shown in FIG. 1, the arbor-cutter assembly 30 is supported at one end by a rotatable spindle 88 mounted in the workhead 74 and at the other end is journaled in the tailstock bearing.

Figure 2:
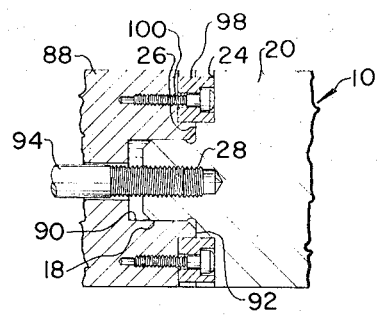
FIG. 2 is a fragmentary sectional view of the arbor pilot diameter end and illustrates the means of attaching the arbor to the grinder headstock spindle.

FIG. 2 illustrates the details of the spindle mounting of the arbor-cutter unit 30. A precision bore 90 in the spindle 88 nonrotatably journals the pilot diameter 18 of the arbor. The bore 90 is concentric with the spindle axis of rotation and is sized for a zero allowance or closest hand assembled fit with the pilot diameter 18. The arbor-cutter unit 30 is drawn tight against the spindle 88 by a drawbolt 94 threadedly engaged in the bore 28 so that a reference surface 92 on the spindle 88, perpendicular to the spindle axis, and the reference surface 26 on the arbor 10 are in full engagement. The drawbolt 94 is accessible from the opposite end of the spindle 88 by means of a hollow bore, not shown, through the spindle and the index plate 96. Drive keys 98 secured to the spindle 88 by fasteners 100 are engaged with the radial slots 24 in the arbor 10.

In placing the composite arbor-cutter assembly 30 on the grinding machine, the cap 80 is removed for ease in installation and then replaced and tightened by the screws 86 until the arbor-cutting assembly may be hand rotated with the spindle 88 for indexing to the grinding position of each cutter tooth 38 without any perceptible shake or movement relative to the tailstock 78. The arbor-cutter assembly 30 is locked in place by the index lock mechanism 104 after the desired circumferential position of each tooth 38 is checked by the indicator 106 mounted on the articulated arm 108.

As the unitary arbor-cutter assembly is rotatively indexed to each cutter tooth for grinding the desired contour, an axis and plane of rotation is established which is maintained with great precision by maintaining the arbor-cutter assembly in toto and after completion of the grinding operation removing the same from the grinding machine 60, and remounting the assembly 30 on a milling machine in an essentially identical manner.

Figure 5:
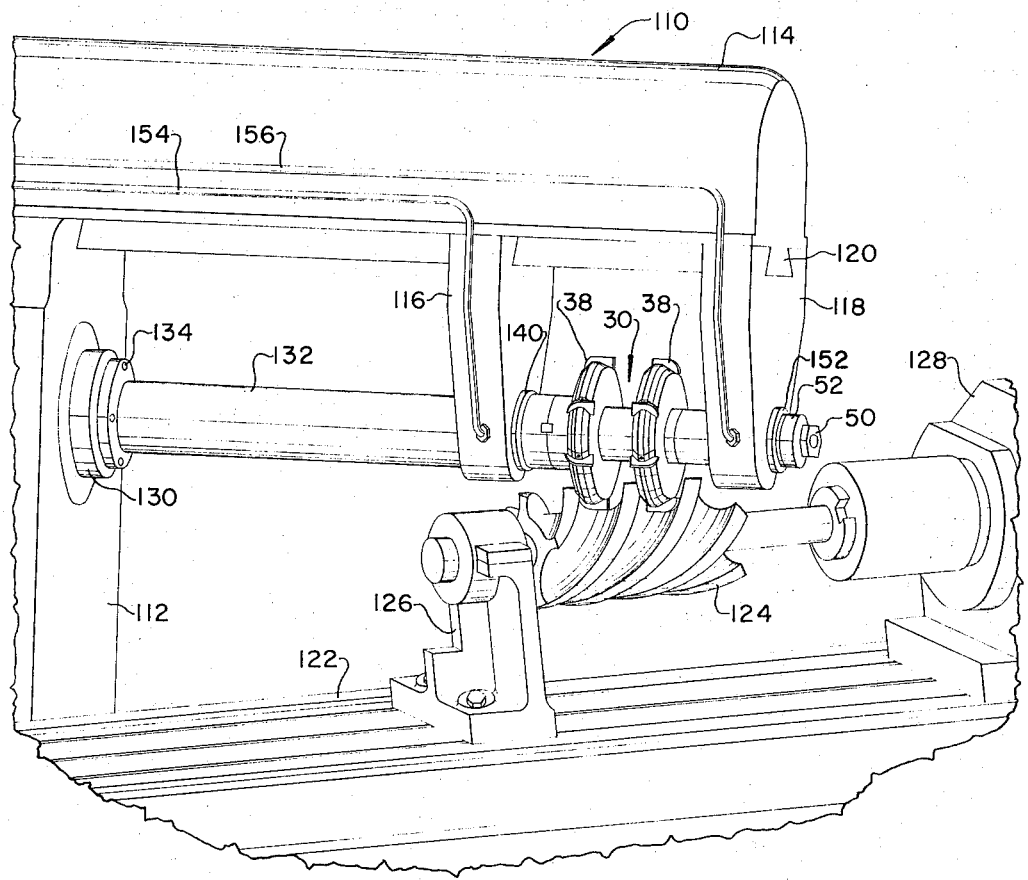
FIG. 5 is a perspective view of a typical universal milling machine with the arbor-cutter assembly of the invention mounted thereon.

In FIG. 5, the unitary arbor-cutter assembly 30 is shown mounted on a universal knee and column milling machine 110 of a type well known in the art and commonly used in form cutting processes. The milling machine 110 includes a column 112 supporting an overarm 114 which includes arbor supports 116 and 118 removably supported by the overarm dovetail 120. The milling machine 110 also includes a table 122 for supporting and positioning the workpiece 124 such as, in the illustrative example, a helical screw compressor rotor. Support for the workpiece 124 to provide for rotation of the same is provided by a bearing support 126 and a driving head 128. A drive spindle 130 extending from the column 112 is drivably connected to a spindle extension 132 by a plurality of fasteners 134. The spindle extension 132 is positioned precisely by a pilot diameter 136 extending into a complementary bore 138 in the spindle 130, and supported near its opposite end by a tapered journal bearing 140 housed in the support 116.

As shown in FIG. 6, the arbor cutter assembly 30 is piloted with a zero allowance fit in a precision bore 142 in the spindle extension 132 by means of the pilot diameter 18. Surfaces 26 on the arbor 10 and a reference surface 144 on the spindle extension 132 are drawn into engagement by the stud 146 threaded into the bore 28 in the arbor and drawn tight by the nut 148 bearing against the surface 150. The arbor-cutter assembly 30 is thereby piloted and squared in the same manner as on the grinding machine. The opposite end of the arbor-cutter assembly 30 is supported by a precision bored journal bearing 152 taper fitted into the arbor support 118 and establishing a journal support to aid in the maintenance of the axis and plane of rotation established in the cutter grinding process.

In accordance with standard practice for precision arbors, for hardened and ground journals lapped into a bronze bushing running clearance for a two-three inch diameter journal can be kept as low as .001 inch. Therefore in practicing the method and using the apparatus of the invention, the minimum bearing clearances permissible become the primary factors to be considered in maintaining the accuracy of the axis of rotation of the arbor-cutter assembly. In order to maintain the minimum bearing clearances desired, the bearings 140 and 152 are pressure lubricated via lines 154 and 156, respectively (see FIG. 5), due to the relatively high cutting forces exerted particularly when using the double cutter shown.

What is claimed is:
1. In precision for milling using a rotary milling cutter including an arbor providing an arbor cutter assembly the method of providing a predetermined form to be cut into a workpiece by said milling cutter comprising the steps of:
  placing and supporting said arbor-cutter assembly,
  rotating said arbor-cutter assembly while being supported to establish an axis of rotation therefor;
  grinding said milling cutter to produce a predetermined form while supporting said arbor-cutter assembly;
  moving said arbor-cutter assembly from said place of support at which said grinding said milling cutter is performed; and,
  supporting said arbor-cutter assembly for performing a milling operation in the same manner as said arbor-cutter assembly was supported for grinding said milling cutter.

2. The method set forth in claim 1 wherein said arbor-cutter assembly is supported for grinding and milling by journalling said arbor.

3. The method set forth in claim 2 wherein said arbor is journalled on opposite sides of said milling cutter.

References Cited

UNITED STATES PATENTS

| 2,477,135 | 7/1949  | Marker et al. | 51—100  |
| 1,341,800 | 6/1920  | Hanson        | 51—288  |
| 1,571,346 | 2/1926  | Schramm       | 51—288  |
| 3,180,229 | 4/1965  | Williams      | 90—11.4 |
| 3,213,567 | 10/1965 | King et al.   | 51—3    |

LESTER M. SWINGLE, Primary Examiner

U.S. Cl. X.R.

51—5